May 21, 1957  L. N. HAYNES  2,792,670
TREE GIRDLER

Filed Dec. 18, 1953  3 Sheets-Sheet 1

Lester N. Haynes
INVENTOR.

BY Jack W. Hayden

ATTORNEY

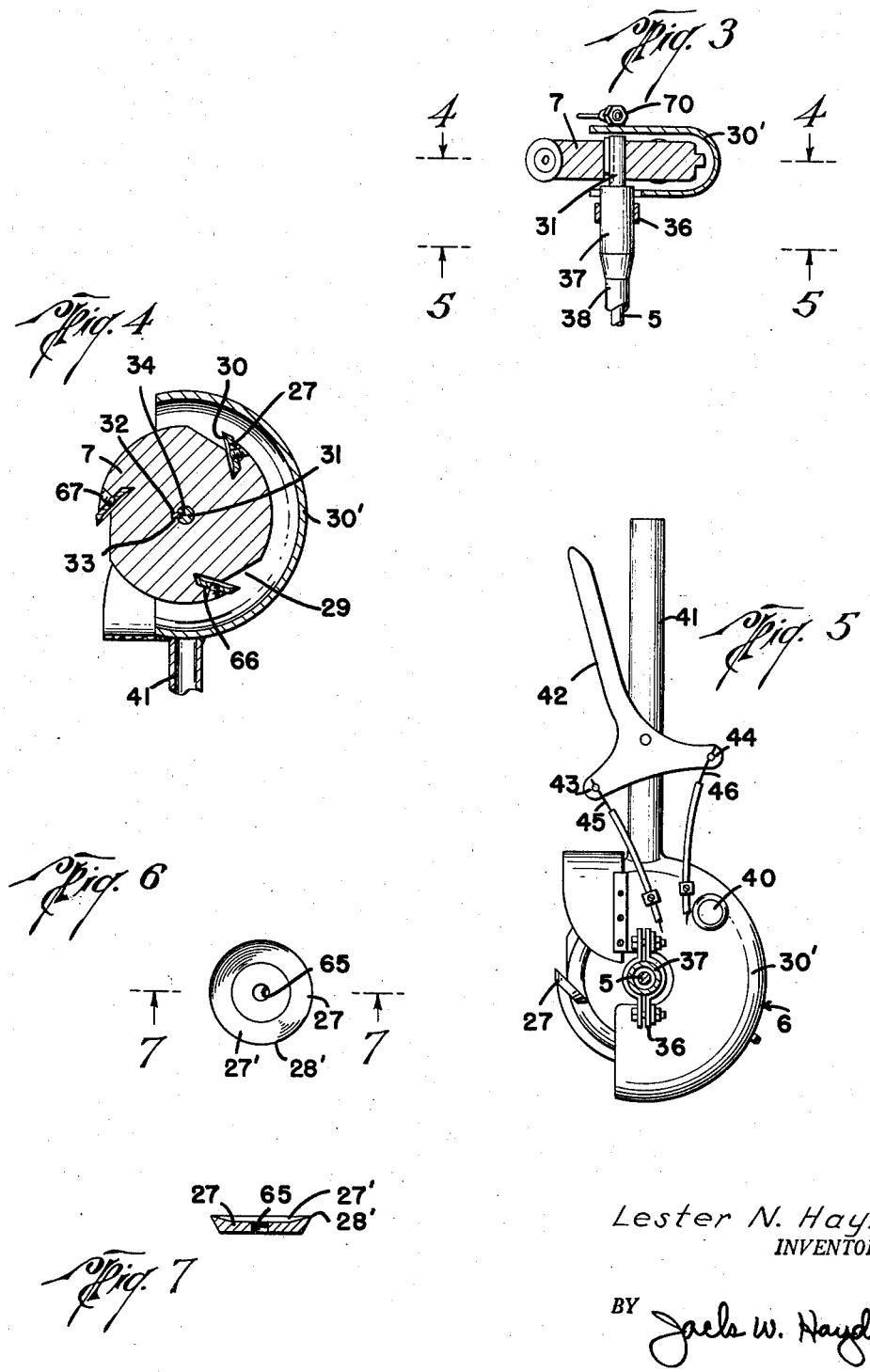

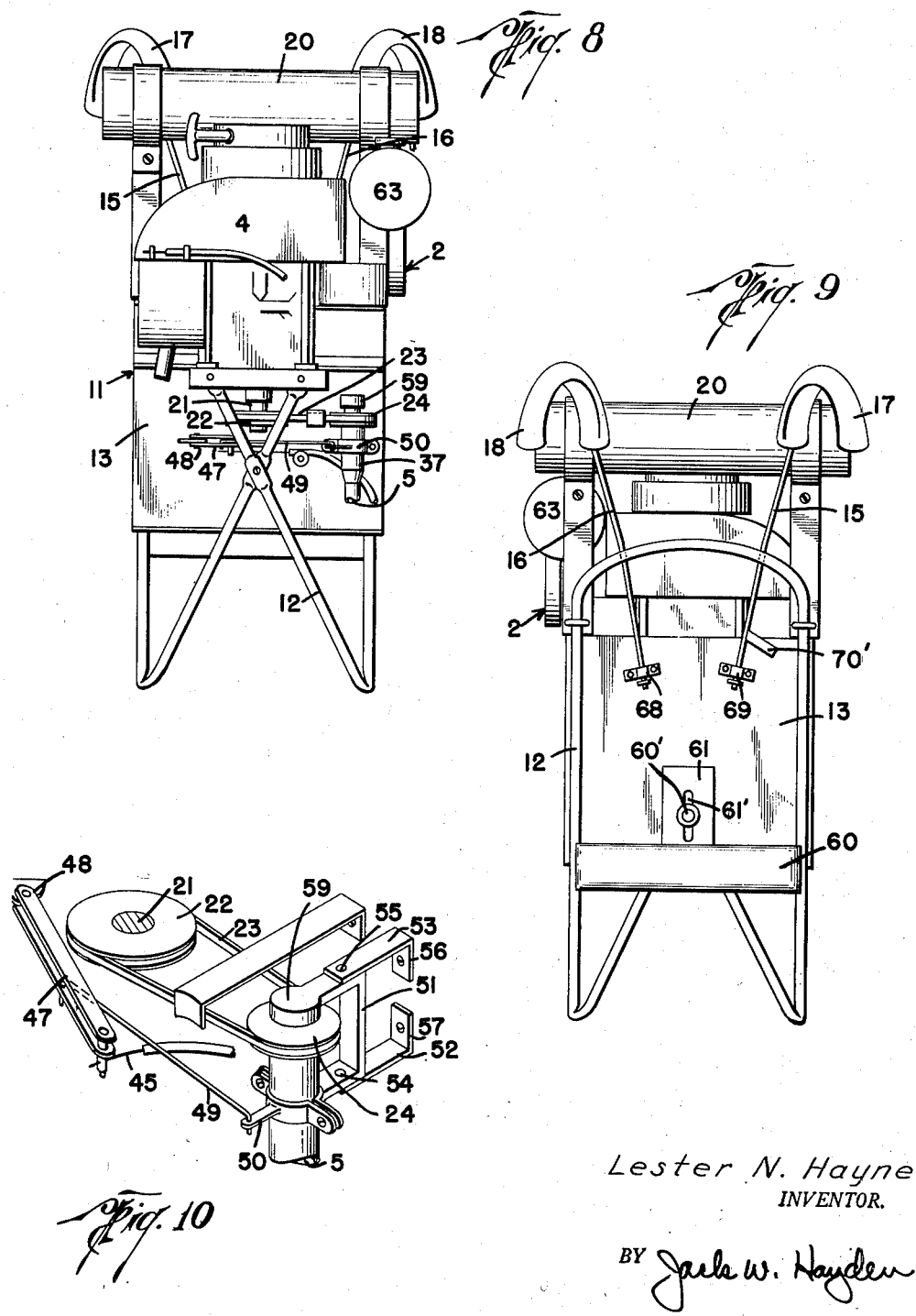

United States Patent Office 2,792,670
Patented May 21, 1957

2,792,670

TREE GIRDLER

Lester N. Haynes, Livingston, Tex.

Application December 18, 1953, Serial No. 399,088

8 Claims. (Cl. 47—1)

The present invention relates to a portable device for cutting a groove in the trunk of a tree.

At the present time it is necessary that lumber companies have crews of men with each man in the crew being supplied with an ax so that a groove may be cut in unwanted trees in a stand of timber, which groove acts to kill the tree. It can readily be appreciated that this procedure is costly, time consuming and extremely inefficient.

The present invention is directed to a portable device which is light enough and so constructed and arranged that it may be carried on the back of an operator, whereby the operator, by means of the power assembly arranged on the device can groove many trees in a single day of operation.

Still another object of the invention is to provide a portable device for cutting a groove in the trunk of a tree which includes a frame, means for supporting the frame on the back of an operator, power means mounted on said frame and a cutter operatively connected to said power means whereby it may be rotated to cut an annular groove in a tree trunk.

A still further object of the invention is to provide a blade for a tree girdler which can be easily and readily sharpened.

Still another object of the invention is to provide a portable device for cutting a groove in the trunk of a tree which includes a frame, means for supporting the frame on the back of an operator, power means mounted on said frame, a cutter operatively connected to said power means whereby it may be rotated to cut an annular groove in a tree trunk, and additional means cooperating with the cutter to inject poison in the groove as such groove is formed in the tree.

Still another object of the invention is to provide in a portable power assembly for cutting a groove in the trunk of a tree, a cutter head arrangement, said cutter head arrangement including a cutter which comprises a disc, a plurality of cutters mounted about the edge of said disc and a cut-away portion in said disc adjacent the leading edge of each of said cutters.

Still another object of the invention is to provide a portable device which can be carried by an operator and which has power means and a cutter operatively connected therewith, whereby a groove may be cut in the trunk of a tree.

Still another object of the invention is to provide a method and apparatus for killing a tree, wherein a groove is cut therein and a poison is simultaneously injected into the freshly cut groove.

Still another object of the invention is to provide a device which can be readily adjusted to fit the back of various individuals.

Other objects and advantages of the invention will become more readily apparent from a consideration of the following description and drawings, wherein:

Fig. 3 is a sectional view on the line 3—3 of Fig. 2 and illustrating an arrangement of the cutter and the housing of the cutter head arrangement;

Fig. 4 is a sectional view on the line 4—4 of Fig. 3 and illustrates the relationship of the cutter to the housing in the embodiment of the cutter head arrangement shown;

Fig. 5 is a bottom view of the embodiment of the cutting head arrangement illustrated;

Fig. 6 is a top view of a cutter blade;

Fig. 7 is a sectional view on the line 7—7 of Fig. 6;

Fig. 8 is a front view of the device illustrating an embodiment of the frame means and power means mounted thereon;

Fig. 9 is a rear view illustrating an embodiment of the frame means and the support means whereby the device may be carried by an operator; and Fig. 10 is a perspective view illustrating a form of the power connection between the power means and power transmission means.

Figures 1, 2:
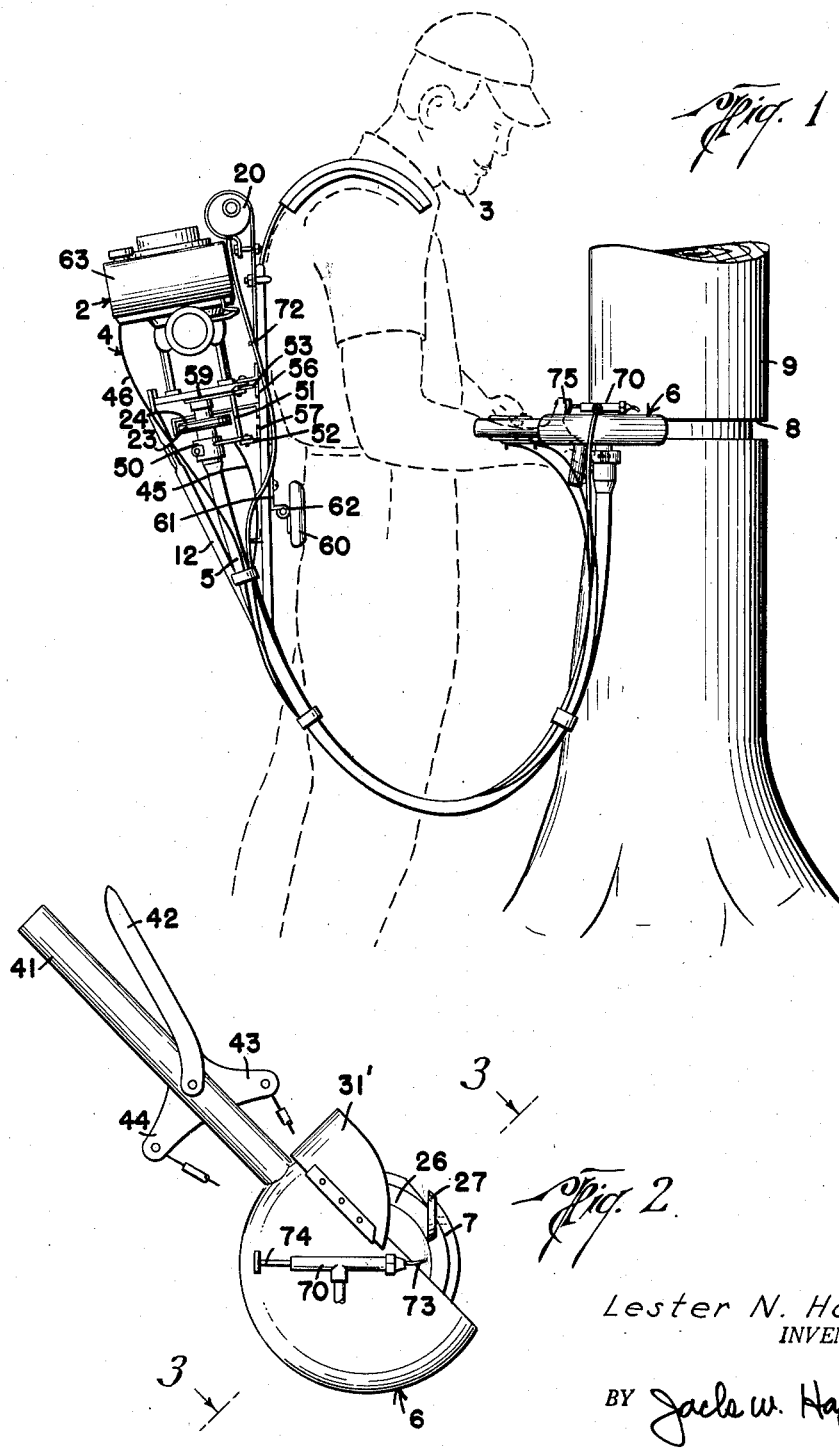
Fig. 1 illustrates a tree trunk with the device in use and cutting a groove in such tree trunk.
Fig. 2 is a top view illustrating an embodiment of the cutter head arrangement.

In Fig. 1, the device is illustrated generally by the numeral 2 and is shown as being carried by the operator shown in dotted line at 3. Power from motor means or prime mover 4 is transmitted through the power transmission means, such as the flexible shaft 5 to the cutter head arrangement illustrated generally at 6, whereby the cutter 7 is rotated to cut the groove 8 about the tree trunk 9.

In Fig. 8, the power means 4 is illustrated and may be a gasoline engine of conventional design. Of course, any other desirable type power means may be used and mounted on the frame denoted generally by the numeral 11. The frame 11 includes the tubular member 12, which is bent and shaped to provide a suitable skeleton on which is mounted the frame plate 13 by any suitable means such as bolts or screws (not shown). Secured to the frame plate 13 are spaced members 15 and 16 which are bent as illustrated at 17 and 18 respectively to fit over the shoulders of the operator, whereby the frame 11, power means 4 and other mechanism of the device to be described in more detail hereinafter may be carried by the operator as illustrated in Fig. 1 of the drawings. Also mounted on the frame 11 is a tank 20 which may be filled with poison to be injected into the groove as the cutter 7 forms such groove in the tree trunk.

Extending from the power means 4 is a power shaft 21, which is adapted to rotate and by means of the pulley 22 arranged on the lower end thereof, belt 23, pulley 24 and rotating or flexible hose 5 rotates the cutter 7 whereby the groove 8 is cut in the tree trunk. The power shaft may be operatively engaged and disengaged relative to flexible shaft 5 as will be more fully discussed hereinafter.

The cutter head arrangement 6 includes the cutter 7 which comprises the disc 26 around the edge of which is mounted a plurality of cutter blades 27 as more clearly illustrated in Fig. 4 of the drawings. The disc 26 is provided with a plurality of cutaway portions 29 adjacent the leading edge 30 of the cutter blades 27 so that as the cutter rotates the blades engage the tree trunk 9 and cut the groove 8 therein. Handle means 40 and 41 are connected to the housing 30' whereby the cutter may be held by the operator and supported in engagement with the tree trunk while cutting the groove therein. Also mounted on housing 30' is shaving guard 31' which keeps the tree shavings from flying against the operator's hand.

The cutter 7 is mounted in the housing 30' by means of the shaft 31 which extends axially through the cutter 7. A cooperating key 32 and keyway 33 in the disc 26 and opposed keyway 34 in shaft 31 serve to retain the disc in position on the shaft 31 as shown in Figs. 3 and 4 of the drawings. The shaft 31 is connected to flexible shaft 5 so that when power shaft 21 is operatively engaged therewith, cutter 7 is rotated. The cutter 7 is positioned relative to the housing 30' by means of the brackets 36 mounted on one side of such housing which brackets engage about the coupling 37 on the end of flexible tubular member 38, which tubular member forms a protective housing for flexible shaft 5.

Pivotally mounted on the handle 41 of housing 30' is the lever 42 which has the diverging portions 43 and 44 integral therewith. Secured to such integral portions is suitable means such as cables 45 and 46 respectively, which may be moved to engage and disengage power shaft 21 with flexible shaft 5 by means of pulleys 22 and 24 and belt 23 interconnecting them. The other cable extends to the power means 4 to increase the speed of said power means as desired.

The connection of cable 45 so as to operatively engage or disengage the power shaft 21 relative to flexible shaft 5 is more clearly illustrated in Fig. 10. The cable 45 is secured at one of its ends to the end of lever 47 which lever is pivotally mounted at one end 48 on the frame plate 13 and extends outwardly therefrom as shown in the drawings. A connection 49 from the lever 47 engages in bracket 50 on one end of the substantially U-shaped frame 51. The U-shaped frame 51 is pivotally mounted in spaced supports 52 and 53 as illustrated at 54 and 55 respectively. The supports 52 and 53 are secured at their inner ends 56 and 57 to frame plate 13 and extend outwardly from such plate. The other end 59 of the U-member 51 is connected to pulley 24 so that movement of connecting member 49 pivots member 51 which in turn moves pulley 24 towards or away from pulley 22.

For example, when cable 45 is moved to the right, as viewed in the drawings, by pivoting lever 42 towards handle 41, lever 47 also moves to the right, as viewed in the drawings, which causes connection 49 to move or pivot U-shaped member 51 to the left about aligned pivots 54 and 55 in supports 52 and 53. This causes pulley 24 to move away from pulley 22 thereby tightening belt 23 so as to operatively engage power shaft 21 of motor 4 and the power connecting means, in the form of flexible shaft 5 to the cutter 7.

It is generally desirable to inject a poison into the groove formed by the cutter and to this end suitable valve means 70 may be mounted on the cutter head arrangement. A supply of poison from the tank 20 is adapted to flow from the hose means 72 to such valve and out through nozzle 73 into the groove 8 in the tree trunk 9. The valve 70 may be of any suitable design or type and may be provided with a stem 74 which is adapted to be engaged as illustrated at 74 in Fig. 1 and operated by the operator. The tank 20 is adapted to receive a pressure medium therein so as to aid in the discharge of the poison through the line 72 and valve 70.

While it is believed that the operation of the invention is apparent by reason of the foregoing discussion of an embodiment of the invention, reference is had to Fig. 1, wherein for purposes of illustration and amplification it will be assumed that the device 2 has been mounted on the operator's back as illustrated in Fig. 1. To provide additional support for the device, a laterally extending padded brace 60 may be provided which is mounted on the frame 11 by any suitable means such as the bracket 61. The brace 60 may be pivotally supported in such bracket 61 as illustrated at 62 so that the brace may conform to the back of the operator as shown in Fig. 1 of the drawings. The bracket 61 is provided with a longitudinal groove 61' in which is positioned the lock nut 60'. The lock nut 60' engages frame plate 13 and thereby positions brace 60 on the device. By means of the groove 61' and lock nut 60', the brace 60 may be positioned longitudinally relative to the operator's back so that such brace will contact the operator at the most comfortable position. The swingable arms 17 and 18 allow the device to be fitted to any operator's shoulders with a minimum of effort.

The motor means 4 may be started prior to the time that the device is placed on the operator's back, or it may be started after the device is in position on the back of the operator. In the form of the invention illustrated in the drawings, the power means 4 is a gasoline motor of conventional design and fuel may be supplied from the tank 63 to the motor in order to operate it. When the motor is in operation, the shaft 21 is in continual rotation so that the cutter can be in turn rotated as desired by means of an arrangement such as that illustrated in Fig. 10 of the drawings. The handles 40 and 41 allow the cutter head arrangement 6 to be firmly grasped by the operator and the cutter 7 thereof held in operative position against the trunk of a tree 9, in order to form the groove 8 therein.

When it is desired to rotate the cutter so that the cutter blades 27 may cut the groove 8 in the tree, the handle or lever 42 is depressed inwardly towards the handle 41 of the cutter head arrangement 6 as illustrated in Fig. 5 of the drawings. This exerts a pull on line 45, which in turn causes the lever 47 mounted on frame plate 13 to pivot or move so as to in turn impart movement to the connection 49. As viewed in Fig. 10, the connection 49 causes the U-shaped member 51 to pivot in support brackets 52 and 53, since such connection is engaged with bracket 50 on the lower end of the U-shaped member 51. This causes pulley 24 and in turn flexible hose 5 to which such pulley is connected to move away from pulley 22 which is engaged to power shaft 21. This tightens belt 23 so that rotation is imparted to the power shaft 21 and transmitted through such shaft to the cutter 7 and its blades 27. It should be noted that tubular member or housing 38 which surrounds flexible hose 5 is provided with a coupling 37, which coupling is engaged and held in bracket 50, such coupling being similar to the coupling 37 on the opposite end of the hose 5. Thus, the flexible housing 38 is secured to bracket 50 at one of its ends and to bracket 36 on the other of its ends; however, flexible hose 5 is connected at one of its ends to pulley 24 and can freely rotate within flexible tubular housing 38 whereby rotation is imparted to the cutter 7 connected to the other end of flexible hose 5. Of course flexible hose 5 and its housing 38 can be of any desired length and are of suitable length as shown in Fig. 1 of the drawings, so that the cutter head arrangement can be held in the operator's hands while the device is supported on the back of the operator.

As the groove is cut in the tree, the operator actuates valve 70 so that poison from tank 20, which tank is under pressure to insure the flow of poison therefrom, flows through line 72, valve 70 and nozzle 73 thereon and into the fresh groove cut.

If it is desired to increase the speed of the motor and thus increase the rotary speed of the cutter 7, continued depression of handle 42 towards handle 41 moves wire 46 so as to open the throttle on motor 4 to increase its speed. Thus, not only does the cutter head arrangement provide a means for operatively engaging and disengaging the cutter relative to the prime mover as desired, but the rate of movement of the cutter can also be regulated.

The cutter blades 27 may be of any suitable configuration, and as illustrated in Figs. 6 and 7, they are disc shaped and are provided with an opening 65, whereby they may be engaged in suitable recesses 66 in the edge of the disc 26 by any suitable means such as the screws 67. Preferably, the blades are recessed as indicated at 27' whereby the cutting edge 28' of the blade may be easily and quickly sharpened. Since the blade 27 is recessed on the leading surface as indicated, it can be seen that only the surface area of the blade surface which acts as the cutting surface need be sharpened from time to time.

Since the cutter can be disengaged relative to the prime mover as desired, the chances of the operator becoming injured by the rotation of the cutter as he moves from tree to tree to cut a groove therein are greatly reduced. Also, if the cutter head is accidentally dropped, it automatically cuts itself off, thereby making the device safe and easy to pick up without shutting off motor 4. In order to facilitate lifting the device 2 on to the back of the operator, and to facilitate shipment of the device, the members 15 and 16 may be rotatably supported on the frame plate 13 by means of the brackets 68 and 69. If desired, a stop arm 70' may be arranged on one of the brackets to limit the rotation thereof.

From the foregoing, it can be seen that the present invention provides a device which quickly and efficiently cuts a groove in a tree and which is provided with a valve means for simultaneously injecting a poison into the groove as it is cut in the tree.

Broadly, the invention relates to a portable device for cutting a groove in a tree with a minimum of effort.

What is claimed is:

1. A portable device for cutting a groove in the trunk of a tree comprising a frame, spaced members connected with said frame for engaging the shoulders of an operator whereby the device may be carried by the operator, power means mounted on said frame, a cutter head arrangement, said cutter head arrangement including a cutter, means engaged with said cutter for supporting said cutter in operative position against the trunk of a tree, means connected from said power means to said cutter for transmitting power from said power means to said cutter, and additional means secured adjacent said cutter for discharging a poison into the groove of the tree trunk as it is formed therein by said cutter.

2. A portable device for cutting a groove in the trunk of a tree comprising a frame, spaced members connected with said frame for engaging the shoulders of an operator whereby the device may be carried by the operator, power means mounted on said frame, a cutter head arrangement, said cutter head arrangement including a cutter, means engaged with said cutter for supporting said cutter in operative position against the trunk of a tree, means connected from said power means to said cutter for transmitting power from said power means to said cutter means, means mounted on said support means and connected to said power transmitting means to control said transmitting means whereby said transmitting means may be operatively engaged and disengaged relative to said power means, and said cutter comprising a rotatable disc for engagement with the trunk of a tree to be grooved, a plurality of cutter blades mounted in said disc adjacent the edge thereof, the leading surface of each of said blades being inclined in the direction of rotation of said disc, and there being a cut-away portion in said disc adjacent the leading surface of each of said cutters for contacting the cutting surface of said blades with a tree trunk to form a groove therein.

3. A portable device for cutting a groove in the trunk of a tree comprising a frame, spaced members connected with said frame for engaging the shoulders of an operator whereby the device may be carried by the operator, power means mounted on said frame, a cutter head arrangement, said cutter head arrangement including a cutter, means for supporting said cutter in operative position against the trunk of a tree, means for transmitting power from said power means to said cutter, said cutter including, a disc for engagement with the trunk of a tree to be grooved, a plurality of cutter blades mounted in said disc adjacent the edge thereof, there being a cut-away portion in said disc adjacent the leading edge of each of said cutters, means for supplying a poison to said cutter head arrangement, valve means mounted on said cutter head arrangement for discharging poison from said supply means into the groove formed by the cutter, and means for controlling the speed of said power means whereby the speed of said cutter is in turn controlled.

4. A portable device for cutting a groove in the trunk of a tree comprising a frame, means for supporting said frame on the shoulders of an operator, power means mounted on said frame, a cutter, said cutter comprising a disc for engagement with the trunk of a tree to be grooved, a plurality of cutter blades mounted in said disc adjacent the edge thereof, the leading surface of each of said blades being inclined in the direction of rotation of said disc, there being a cut-away portion in said disc adjacent the leading surface of each of said cutters, and means for transmitting power from said power means to said cutter.

5. A portable device for cutting a groove in the trunk of a tree comprising a frame, means for supporting said frame on the shoulders of an operator, power means mounted on said frame, and a cutter operatively connected to said power means, said cutter comprising a disc for engagement with the trunk of a tree to be grooved, a plurality of cutter blades mounted in said disc adjacent the edge thereof, the leading surface of each of said blades being inclined in the direction of rotation of said disc, and there being a cut-away portion in said disc adjacent the leading surface of each of said cutters.

6. A rotary cutter for cutting a groove in the trunk of a tree comprising a disc for engagement with the trunk of a tree to be grooved, a plurality of cutter blades mounted in said disc adjacent the edge thereof, the leading surface of each of said blades being inclined in the direction of rotation of said disc, there being a cut-away portion in said disc adjacent the leading edge of each of said cutters, and said blades being recessed on the leading surface thereof to present a relatively small surface as a cutting edge to facilitate sharpening of said blades.

7. A cutter head arrangement for cutting a groove in the trunk of a tree comprising a cutter, said cutter including a rotatable disc for engagement with the trunk of a tree to be grooved, a plurality of cutters mounted in said disc adjacent the edge thereof, the leading surface of each of said blades being inclined in the direction of rotation of said disc, there being a cut-away portion in said disc adjacent the leading edge of each of said cutters, each of said blades being recessed on the leading surface thereof to present a relatively small surface on said blade as a cutting edge, a housing for rotatably supporting said cutter, and handle means mounted on said housing for supporting said cutter in operative position against the trunk of a tree.

8. A portable device for cutting a groove in the trunk of a tree comprising a frame, spaced members connected with said frame for engaging the shoulders of an operator whereby the device may be carried by the operator, power means mounted on said frame, a cutter head arrangement, said cutter head arrangement including a cutter, means for supporting said cutter in operative position against the trunk of a tree, means for transmitting power from said power means to said cutter, said cutter including, a disc for engagement with the trunk of a tree to be grooved, a plurality of cutter blades mounted in said disc adjacent the edge thereof, there being a cut-away portion in said disc adjacent the leading edge of each of said cutters, each of said blades being recessed on the leading surface thereof to present a relatively small surface on said blade as a cutting edge, means for supplying a poison to said cutter head arrangement, valve means mounted on said cutter head arrangement for discharging poison from said supply means into the groove formed by the cutter, and means for controlling the speed of said power means whereby the speed of said cutter is in turn controlled.

(References on following page)

References Cited in the file of this patent

UNITED STATES PATENTS

| | | |
|---|---|---|
| 773,743 | Von Hoffmann | Nov. 1, 1904 |
| 1,170,967 | Donning | Feb. 8, 1916 |
| 1,361,305 | Buck | Dec. 7, 1920 |
| 1,646,812 | Davey et al. | Oct. 25, 1927 |
| 1,700,030 | Davey | Jan. 22, 1929 |
| 1,702,337 | Davey | Feb. 19, 1929 |
| 2,423,419 | Stuber | July 1, 1947 |
| 2,519,936 | Sayre | Aug. 22, 1950 |
| 2,563,195 | Soule et al. | Aug. 7, 1951 |
| 2,632,487 | Davison | Mar. 24, 1953 |

FOREIGN PATENTS

| | | |
|---|---|---|
| 21,813 | Australia | of 1929 |
| 953,994 | France | June 6, 1949 |
| 238,239 | Great Britain | Feb. 25, 1926 |
| 380,036 | Italy | Apr. 17, 1940 |
| 242,400 | Switzerland | Oct. 1, 1946 |
| 256,614 | Switzerland | Mar. 1, 1949 |